(12) United States Patent
Lass et al.

(10) Patent No.: US 11,387,750 B2
(45) Date of Patent: Jul. 12, 2022

(54) SYSTEM AND METHOD FOR REVERSE BATTERY PROTECTION IN REGENERATIVE MOTOR DRIVE

(71) Applicant: Nidec Motor Corporation, St. Louis, MO (US)

(72) Inventors: David E. Lass, Addison, IL (US); Priscilla K. Dobbin, St. Charles, IL (US)

(73) Assignee: Nidec Motor Corporation, St. Louis, MO (US)

( * ) Notice: Subject to any disclaimer, the term of this patent is extended or adjusted under 35 U.S.C. 154(b) by 246 days.

(21) Appl. No.: 16/867,115

(22) Filed: May 5, 2020

(65) Prior Publication Data

US 2021/0351725 A1 Nov. 11, 2021

(51) Int. Cl.
*H02P 3/14* (2006.01)
*H01M 10/46* (2006.01)
*H01M 10/44* (2006.01)
*H01M 10/42* (2006.01)

(52) U.S. Cl.
CPC .......... *H02P 3/14* (2013.01); *H01M 10/4257* (2013.01); *H01M 10/44* (2013.01); *H01M 10/46* (2013.01); *H01M 2010/4271* (2013.01); *H01M 2220/20* (2013.01)

(58) Field of Classification Search
CPC ..... H02P 3/14; H01M 10/4257; H01M 10/44; H01M 10/46; H01M 2010/4271; H01M 2220/20
See application file for complete search history.

(56) References Cited

U.S. PATENT DOCUMENTS

| | | | |
|---|---|---|---|
| 9,350,238 B2 | 5/2016 | Hara et al. | |
| 2010/0148733 A1 | 6/2010 | Koeppl et al. | |
| 2015/0311799 A1 | 10/2015 | Okaniwa et al. | |
| 2016/0380448 A1 | 12/2016 | Seo et al. | |

FOREIGN PATENT DOCUMENTS

| | | | |
|---|---|---|---|
| CN | 212137360 U | * | 12/2020 |
| JP | 2014103798 | | 6/2014 |

OTHER PUBLICATIONS

International Search Report and Written Opinion for PCT Application No. PCT/US2021/030051 entitled System and Method for Reverse Battery Protection in Regenerative Motor Drive (dated Aug. 17, 2021).

* cited by examiner

Primary Examiner — Karen Masih
(74) Attorney, Agent, or Firm — Hovey Williams LLP (57) ABSTRACT

A system and method for facilitating regenerative charging of a battery by a motor drive when the battery is properly physically connected to a drive circuitry and blocking current when the battery is improperly physically connected. The system includes drive circuitry, a battery and motor drive connected to the drive circuitry, an N-channel MOSFET connected to a high side of the drive circuitry, and a FET controller including a charge pump connected to a gate terminal of the N-channel MOSFET. When the battery is properly physically connected to the drive circuitry, the charge pump is switched on and the N-channel MOSFET allows reverse current to flow from the motor drive to recharge the battery. When the battery is improperly physically connected to the drive circuitry, the charge pump is switched off and the N-channel MOSFET blocks current from flowing and damaging the battery.

8 Claims, 5 Drawing Sheets

SYSTEM AND METHOD FOR REVERSE BATTERY PROTECTION IN REGENERATIVE MOTOR DRIVE

FIELD

The present invention relates to systems and methods for protecting motor drive electronics and batteries in regenerative motor drive systems, and more particularly, embodiments concerning a system and method for facilitating regenerative charging of a battery by a motor drive when the battery is properly physically connected to a drive circuitry and blocking voltage from passing and current from flowing when the battery is improperly physically connected.

BACKGROUND

Motors are primarily used to convert electrical energy into mechanical energy. However, when the synchronous speed of a motor is less than the speed of its rotor, the motor acts as a generator and converts mechanical energy into electrical energy. This electrical energy is typically fed back into capacitors on the electrical bus, but the bus can only handle a limited amount of voltage before the drive registers a bus overvoltage fault. A regenerative motor drive takes the electrical energy generated by the motor and feeds it back to the power source (for example, a battery) or to other drives connected to the bus. Whether the generated electrical energy is fed back to the source or to other drives, it is used again rather than being lost to heat (as it is with a traditional dynamic brake).

In a regenerative motor drive, it is necessary to protect the battery from the effects of reversing voltage and current, and to protect the drive electronics from the effects of reversing the battery polarity. Existing methods of achieving reverse battery polarity protection for a circuit include using a series diode or a power metal oxide semiconductor field-effect transistor (MOSFET) on either the high side or low side of the battery power input. With some power MOSFETs, an additional gate voltage is required which is higher than the battery supply voltage, which necessitates additional circuitry to generate and maintain the additional gate voltage. Common methods of generating the gate voltage include various configurations of DC-DC converters, voltage multipliers, and charge pumps. Using series diodes for reverse battery polarity protection is simple and effective and can be used on either polarity of the bus. However, this configuration blocks regeneration current to the battery. Further, this configuration introduces a small voltage drop between the battery and the operating circuitry. In some cases, this voltage drop may interfere with the desired operation of the attached circuit. In other cases, large motor currents make this impractical due to the heat generated by the diode and the additional board space required to support a larger part to dissipate the heat.

Among MOSFET solutions, P-channel devices may be employed on the high side of the battery power input. This configuration typically reduces the voltage drop resulting from using a series diode, but with higher motor currents these devices can still generate significant heat. Further, available variations of P-channel devices are less prevalent and costlier than their N-channel counterparts. N-channel devices are available with lower on-resistance than P-channel devices, and which therefore generate less heat during operation. N-channel devices are typically used on the low side of the battery power input because few additional parts are required and the MOSFET gate can be driven directly from the high side of the battery power input. However, this situation creates a small voltage drop between battery ground and circuit ground which may interfere with circuit operation. Other devices, connected via system wiring, may also defeat the reverse battery protection circuit by grounding the battery input to the output of the reverse battery protection MOSFET.

Using an N-channel device on the battery high-side input is less common because the gate must be driven higher than the battery power input voltage and this higher voltage is typically not available without the addition of boost voltage circuitry which adds cost and consumes valuable circuit board space. A typical boost voltage circuit also requires a pulsating signal to drive it, and, therefore, additional pulsating circuitry or a separate fixed signal source may be required. Further, boost voltage circuits are sometimes susceptible to temperature variation extremes. Fixed signal dependence can also be potentially risky if the signal source suddenly ceases oscillating.

This background discussion is intended to provide information related to the present invention which is not necessarily prior art.

SUMMARY

Embodiments address the above-described and other disadvantages by providing a system employing a high-side N-channel MOSFET and an unconventionally configured FET controller to facilitate regenerative charging of a battery by a motor drive when the battery is properly physically connected to a drive circuitry, protect the drive electronics from the effects of reversing the battery, and to block current flow when the battery is improperly physically connected. More specifically, in conventional use, the IN terminal of the FET controller receives the battery voltage, and the OUT terminal receives the output voltage of the N-channel MOSFET. In embodiments of the present invention, the IN terminal still receives the battery voltage, but the OUT terminal receives a control voltage from a voltage divider circuit. The FET controller provides an output voltage on the GATE CONTROL terminal to charge the gate of the N-channel MOSFET only if the battery voltage on the IN terminal is greater than the control voltage on the OUT terminal, which only occurs if the battery is properly physically connected to the drive circuitry.

In an embodiment of the present invention, a system is provided for facilitating regenerative charging of a battery by a motor drive when the battery is properly physically connected to drive circuitry and blocking regenerative charging of the battery by the motor drive when the battery is improperly physically connected to the drive circuitry. The system may include an N-channel MOSFET connected to a high side of the drive circuitry, and a FET controller connected to the high side of the drive circuitry. The FET controller may include a charge pump connected to a gate terminal of the N-channel MOSFET and configured to control operation of the N-channel MOSFET. When the battery is properly physically connected to the drive circuitry, the FET controller may hold the charge pump in continuous operation when a reverse current is driven on the drive circuitry and thereby provide a boost voltage to the gate terminal and allow a reverse current to flow through the N-channel MOSFET to the battery. When the battery is improperly physically connected to the drive circuitry, the FET controller may deactivate the charge pump and thereby not provide the boost voltage to the gate terminal, causing the N-channel MOSFET to remain open and blocking the reverse current from reaching the battery.

Various implementations of the foregoing embodiment may include any one or more of the following additional features. The motor drive may be a three-phase electric motor. The battery may include a positive terminal and a negative terminal, and the battery may be properly physically connected to the drive circuitry when the positive terminal of the battery is electrically connected to the high side of the drive circuitry. The N-channel MOSFET, the FET controller, and at least part of the drive circuitry may be physically incorporated into a motor controller which is physically attached to the motor drive and configured to control operation of the motor drive.

In another embodiment of the present invention, a system may comprise a drive circuitry, a battery, a motor drive, an N-channel MOSFET, and a FET controller. The drive circuitry may include a high side and a low side. The battery may be connected to the drive circuitry, configured to store electrical energy, and include a positive terminal and a negative terminal. The motor drive may be connected to the drive circuitry and configured to receive the electrical energy from the battery via the drive circuitry and convert the electrical energy into mechanical energy, and to convert mechanical energy into reverse current and provide the reverse current via the drive circuitry to the battery. The N-channel MOSFET may be connected to the high side of the drive circuitry. The FET controller may be connected to the high side of the drive circuitry, and may include a charge pump connected to a gate terminal of the N-channel MOSFET and configured to control operation of the N-channel MOSFET. When the positive terminal of the battery is connected to the high side of the drive circuitry, the FET controller may hold the charge pump in continuous operation when the reverse current is present on the drive circuitry and thereby provide a boost voltage to the gate terminal and allow the reverse current to flow through the N-channel MOSFET to the battery. When the positive terminal of the battery is not connected to the high side of the drive circuitry, the FET controller may switch off the charge pump and thereby remove the boost voltage from the gate terminal and cause the N-channel MOSFET to block the reverse current from reaching the battery.

Various implementations of the foregoing embodiment may include any one or more of the following additional features. The motor may include a three-phase electric motor. The N-channel MOSFET, the FET controller, and at least part of the drive circuitry may be physically incorporated into a motor controller which is physically attached to the motor and configured to control operation of the motor drive.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments provide a system and method employing a high-side N-channel MOSFET and an unconventionally configured FET controller to facilitate regenerative charging of a battery by a motor drive when the battery is properly physically connected to a drive circuitry, and to block regenerative charging when the battery is improperly physically connected. In more detail, embodiments provide a compact solution for reverse battery protection for a regenerative motor drive used in, for example, a robotic application, which allows reverse current to flow from the motor drive backward through the protection circuit and into the battery during a motor regeneration mode, and which blocks the potentially damaging reverse current if the battery is improperly physically connected. In one implementation, the protection circuit may maintain a common circuit ground, operate independently of the drive's control logic, and remain engaged at any level of battery charge.

In previous high-side series diode solutions the size of the physical component required to dissipate the resulting heat may be unacceptable; in previous high-side P-channel MOSFET solutions motor currents may generate too much heat to be viable; in previous low-side N-channel MOSFET solutions the requirement for a common ground may not be supported; and in previous high-side N-channel MOSFET solutions thermal variations may limit success.

Embodiments of the present invention provide a high-side N-channel MOSFET solution incorporating a compact high-side OR-ing FET controller (for example, LM5050 by Texas Instruments) into the protection circuit to generate a boost voltage via an internal charge pump. The FET controller was designed to control (switching on and off) the high-side N-channel MOSFET in a multiple redundant power supply to prevent the flow of reverse current and consequential damage to one or more of its redundant power supplies. In the present invention, the FET controller is configured to intentionally allow reverse current to flow through the N-channel MOSFET. In a motor drive, reverse current is desired during motor regeneration mode because it allows excess voltage and current from the motor to flow backward and be recaptured by the battery. When the battery is correctly physically connected to the drive circuitry, the circuitry holds the charge pump of the FET controller in continuous operation when motor voltage is present, thereby allowing motor regeneration to take place as desired or required. However, when the battery is incorrectly physically connected to the drive circuitry, the FET controller switches off the charge pump, causing the N-channel MOSFET to block the flow of reverse current, and protecting the battery from potential damage. Embodiments advantageously provide greater thermal stability than prior art designs in a compact design, and allow regenerative motor currents to flow back into the battery independent of charge level and without requiring a pulsating signal source.

Figure 1:
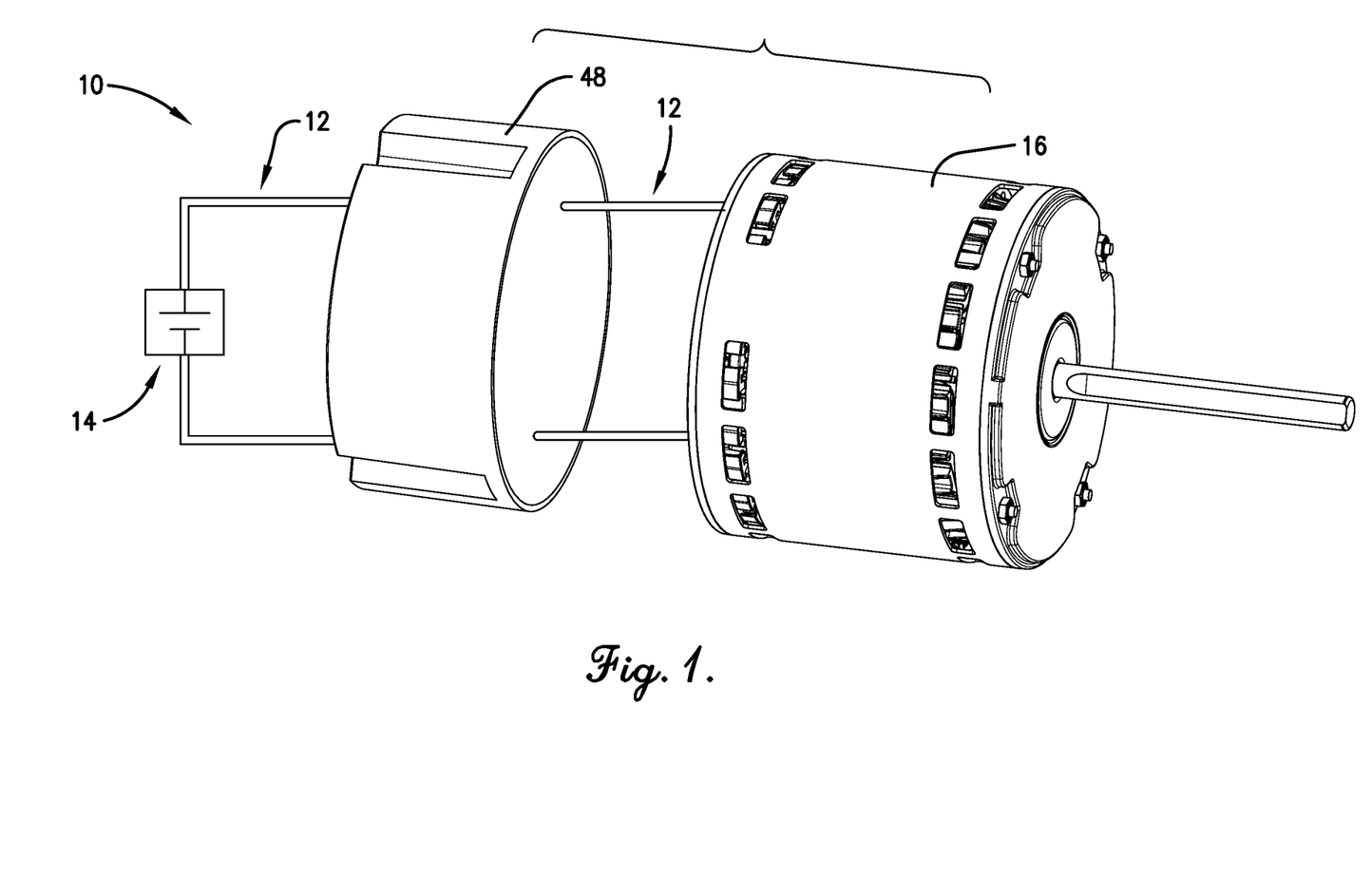
FIG. 1 is a partially exploded perspective depiction of a system for facilitating regenerative charging of a battery by motor drive when the battery is properly physically connected to a drive circuitry and blocking current and voltage when the battery is improperly physically connected.
Figure 2:
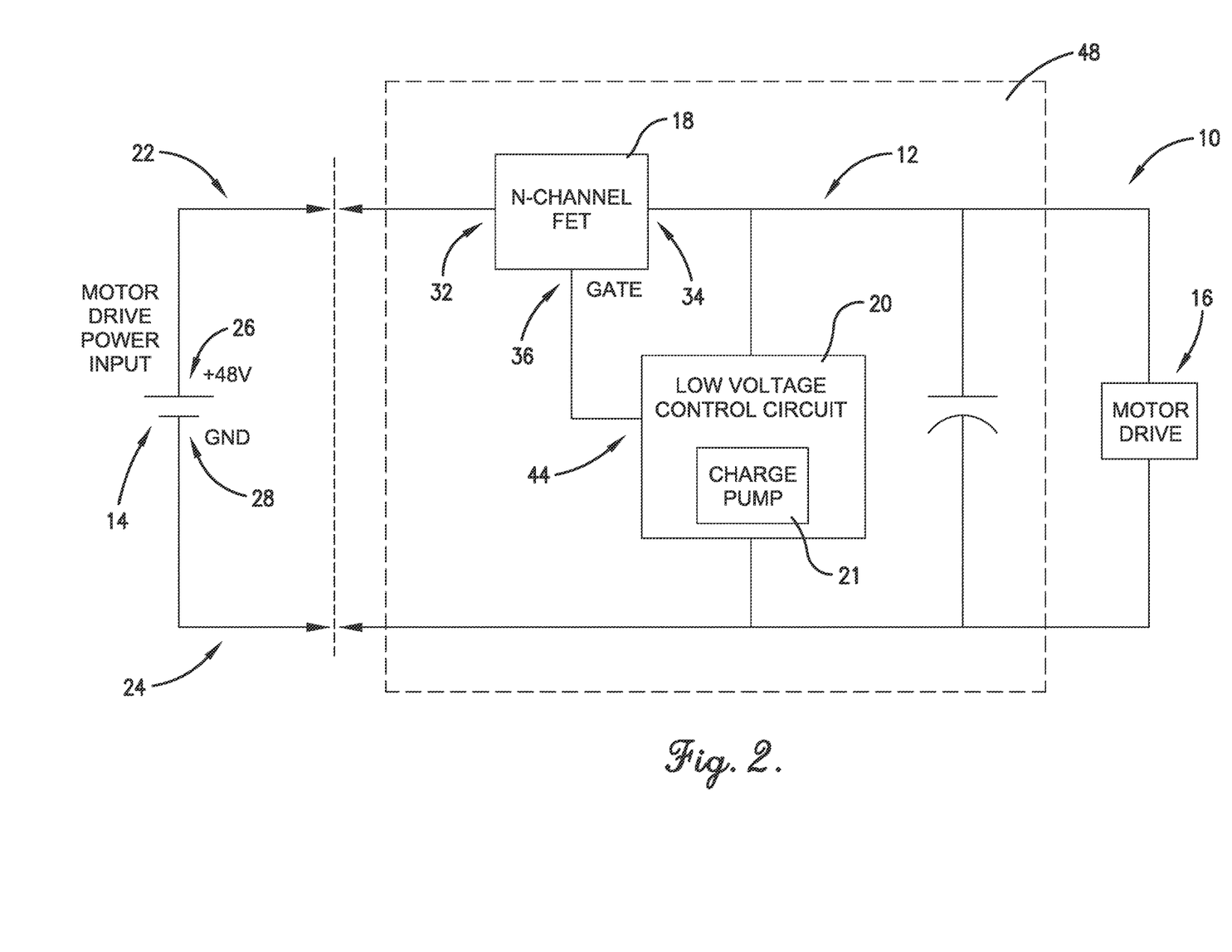
FIG. 2 is a block diagram of an embodiment of the system of FIG. 1.
Figure 3:
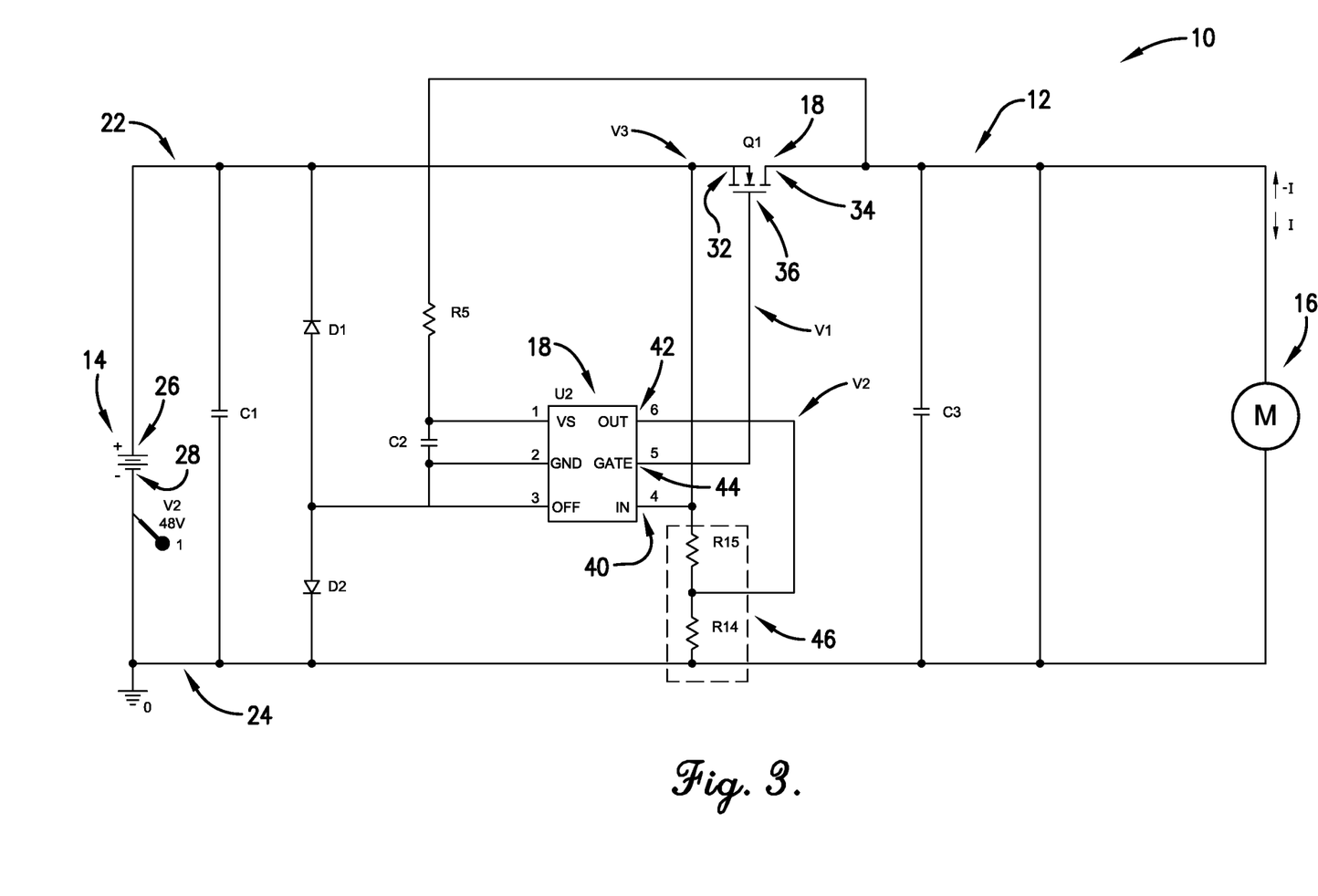
FIG. 3 is a circuit diagram of an implementation of the embodiment of the system of FIG. 1.

Referring to FIGS. 1-3, an embodiment of a system 10 is shown for both facilitating regenerative charging of a battery by a motor drive when the battery is properly physically connected to a drive circuitry and blocking regenerative current from reaching the battery when the battery is improperly physically connected to the drive circuitry. The system 10 may broadly comprise the drive circuitry 12; the battery 14; the motor drive 16; an N-channel MOSFET 18; and a FET controller 20. The drive circuitry 12 may be configured to electrically connect to and interconnect the various other components, and may have a high side 22 and a low (or ground) side 24.

The battery 14 may be configured to store and release electrical energy, and may have a positive terminal 26 electrically connected to the drive circuitry 12 and a negative terminal 28 electrically connected to the drive circuitry 12. When the battery 14 is properly physically connected to the drive circuitry 12, the positive terminal 26 is connected to the high side 22 and the negative terminal 28 is connected to the low side 24. When the battery 14 is improperly physical connected to the drive circuitry 12, the negative terminal 28 is connected to the high side 22 and the positive terminal 26 is connected to the low side 24.

In a normal mode of operation, the motor drive 16 may receive and be driven by stored electrical energy from the battery 14 via the drive circuitry 12, thereby converting electrical energy to mechanical energy. In a regenerative mode of operation, the battery 14 may receive and be recharged by generated electrical energy from the motor drive via the drive circuitry 12, thereby converting mechanical energy to electrical energy. In one implementation, the motor drive 16 may include, for example, a three-phase electric motor.

The N-channel MOSFET 18 may be configured to control (that is, allow or block) current flow on the drive circuitry 12, and may include at least three terminals: a SOURCE terminal 32, a DRAIN terminal 34, and a GATE terminal 36. The SOURCE and DRAIN terminals 32, 34 may be electrically connected to the high side 22 of the drive circuitry 12, and the GATE terminal 36 may be electrically connected to the FET controller 20.

The FET controller 20 may be configured to control operation of the N-channel MOSFET, and may include at least three terminals: an IN terminal 40, an OUT terminal 42, and a GATE CONTROL terminal 44. The IN terminal 40 may be electrically connected to the high side 22 of the drive circuitry 12. The OUT terminal 42 may be electrically connected to a voltage divider circuit 46 configured to provide a lower voltage to the OUT terminal 42 than is provided to the IN terminal 40 when the battery 14 is properly physically connected to the drive circuitry 12. The GATE CONTROL terminal 44 may be electrically connected to the GATE terminal 36 of the N-channel MOSFET, and configured to facilitate switching the N-channel MOSFET on and off. More specifically, when the battery 14 is properly physically connected to the drive circuitry 12, the GATE CONTROL terminal 44 provides a voltage to the GATE terminal 36 and thereby switches on the N-channel MOSFET and allows current to flow from the motor drive 16 to the battery 14 during the regenerative mode of operation. When the battery 14 is improperly physically connected to the drive circuitry 12, the GATE CONTROL terminal 44 does not provide the voltage to the GATE terminal 36, and thereby switches off the N-channel MOSFET and blocks current from flowing from the motor drive 16 to the battery 14 during the regenerative mode of operation.

In one implementation, the FET controller 20 may include a charge pump 21, and if the positive terminal 26 of the battery 14 is properly physically connected to the high side 22 of the drive circuitry 12, the charge pump 21 continuously operates when reverse current is present on the drive circuitry 12 (that is, when in the regenerative mode of the operation), thereby providing a boost voltage to the GATE terminal 36 and allowing the reverse current to flow through the N-channel MOSFET 18 to recharge the battery 14. However, if the positive terminal 26 of the battery 14 is not properly physically connected to the high side 22 of the drive circuitry 12, the charge pump 21 is deactivated, thereby blocking the boost voltage from the GATE terminal 36 and causing the N-channel MOSFET 18 to block the reverse current to protect the battery 14. Thus, when the battery 14 is improperly physically connected to the drive circuitry 12, the charge pump 21 of the FET controller 20 is switched off which causes the N-channel MOSFET 18 to block the reverse current from reaching the battery 14 and damaging it.

In one implementation, the FET controller 20 may be an LM5050 device available from Texas Instruments, or a functionally equivalent device. The LM5050 is designed for conventional use in a system that refuses regenerative power. The present invention unconventionally employs the LM5050 in a system that uses regenerative power. More specifically, in conventional use, the IN terminal of this FET controller receives the battery voltage, and the OUT terminal receives the output voltage of the N-channel MOSFET. In the present invention, the IN terminal still receives the battery voltage, but the OUT terminal receives a control voltage from the voltage divider circuit. The FET controller provides an output voltage on the GATE CONTROL terminal to charge the gate of the N-channel MOSFET only if the battery voltage on the IN terminal is greater than the control voltage on the OUT terminal, which only occurs if the battery is properly physically connected to the drive circuitry.

In one implementation, at least part of the drive circuitry 12, the N-channel MOSFET 18, and the FET controller 20 may be physically incorporated into a motor controller 48 which may be physically attached to the motor drive 16 and configured to control operation of the motor drive 16.

Figure 4:
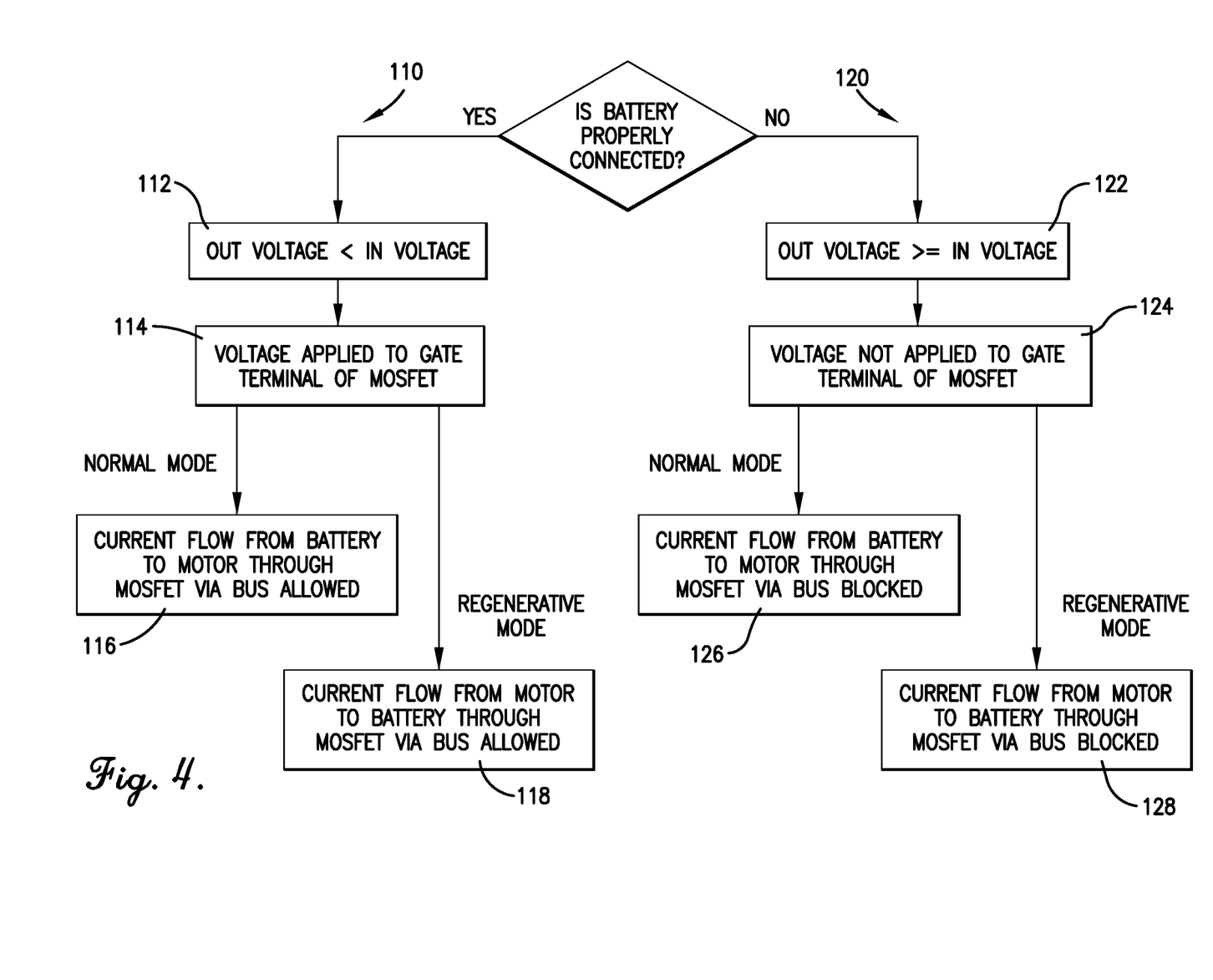
FIG. 4 is a flowchart of steps in the operation of the system of FIG. 1.
Figure 5:
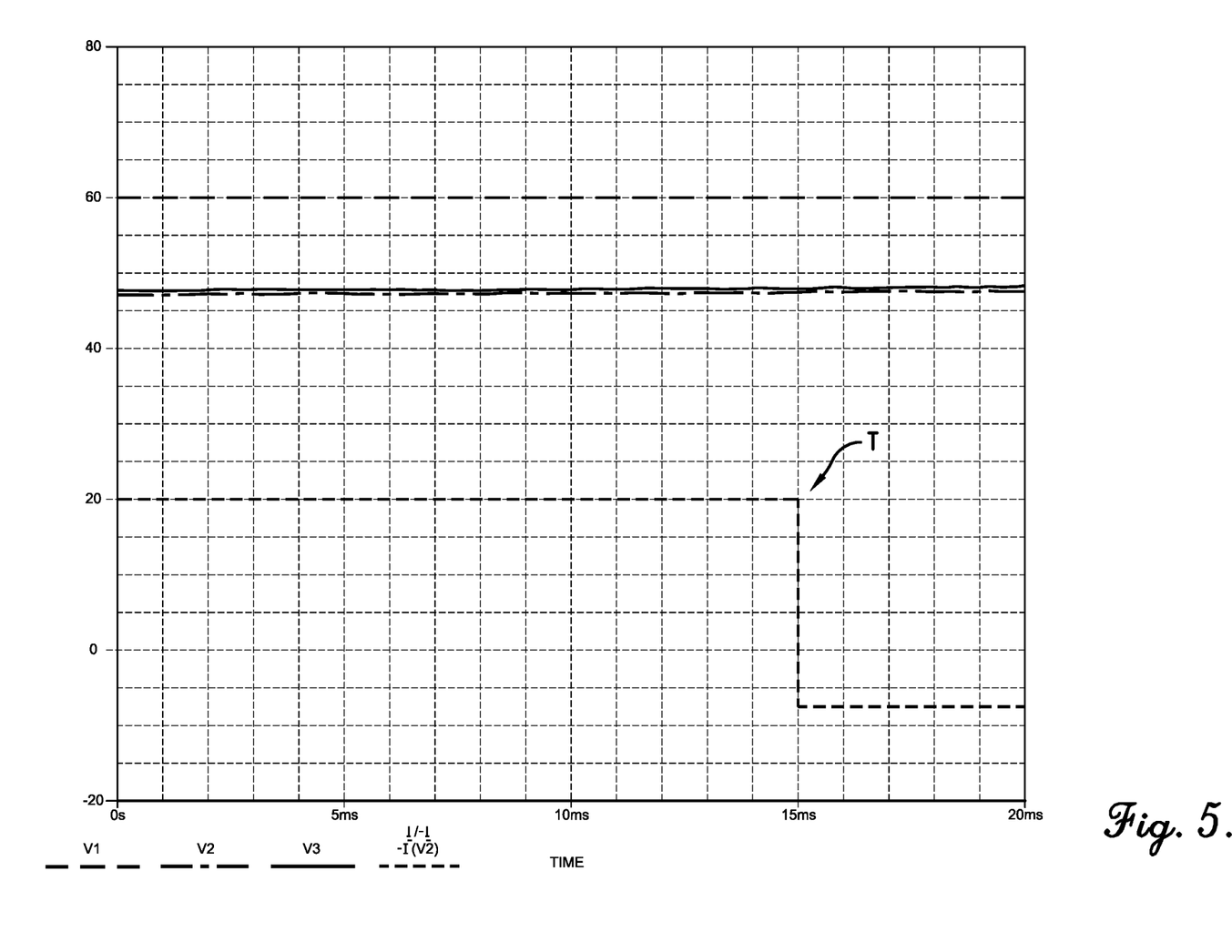
FIG. 5 is an exemplary graph of voltage and current signals resulting from operation of the system of FIG. 1.

Referring to FIGS. 4 and 5, in one implementation, the system 10 and a corresponding method of operation may function substantially as follows.

If the battery 14 is properly physically connected to the drive circuitry 12, as shown in path 110, the voltage V2 at the OUT terminal 42 of the FET controller 20 is lower than the voltage V3 at the IN terminal 40, as shown in step 112, and the GATE CONTROL terminal 44 of the FET controller 20 provides a voltage V1 to the GATE terminal 36 of the N-channel MOSFET 18, as shown in step 114. As a result, the N-channel MOSFET 18 allows current to flow between the battery 14 and the motor drive 16 via the drive circuitry 12.

In the normal mode of operation, the motor drive 16 may receive and be driven by stored electrical energy from the battery 14 through the N-channel MOSFET 18 via the drive circuitry 12, as shown in 116. In the regenerative mode of operation, the battery 14 may receive and be recharged by generated electrical energy from the motor drive 16 through the N-channel MOSFET 18 via the drive circuitry 12, as shown in 118. The transition between normal mode in which forward current I is present and regenerative mode in which reverse current is present occurs at time T in FIG. 5.

If the battery 14 is improperly physically connected to the drive circuitry 12, as shown in path 120, the voltage V2 at the OUT terminal 42 of the FET controller 20 is not lower than the voltage V3 at the IN terminal 40, as shown in step 122, and the GATE CONTROL terminal 44 of the FET controller 20 does not provide the voltage V1 (that is, V1 is zero) to the GATE terminal 36 of the N-channel MOSFET 18, as shown in step 124. As a result, the N-channel MOSFET 18 blocks current from flowing between the battery 14 and the motor drive 16 via the drive circuitry 12.

With the battery 14 improperly physically connected to the drive circuitry 12, in the normal mode of operation, the motor drive 16 will not receive stored electrical energy from the battery 14 through the N-channel MOSFET 18 via the drive circuitry 12, as shown in 126. In the regenerative mode of operation, the battery 14 will not receive generated electrical energy from the motor drive 16 through the N-channel MOSFET 18 via the drive circuitry 12, as shown in 128.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

The invention claimed is:

1. A system for facilitating regenerative charging of a battery by a motor drive when the battery is properly connected to a drive circuitry, and for blocking regenerative charging of the battery by the motor drive when the battery is improperly connected to the drive circuitry, the system comprising:
   a N-channel MOSFET connected to a high side of the drive circuitry; and
   a FET controller connected to the high side of the drive circuitry and including a charge pump connected to a gate terminal of the N-channel MOSFET, and configured to control operation of the N-channel MOSFET by—
      when the battery is properly connected to the drive circuitry, holding the charge pump in continuous operation when a reverse current is driven on the drive circuitry and thereby provide a boost voltage to the gate terminal and allow the reverse current to flow through the N-channel MOSFET to the battery, and
      when the battery is improperly connected to the drive circuitry, deactivating the charge pump and thereby not provide the boost voltage to the gate terminal and thereby cause the N-channel MOSFET to remain open and non-conducting and thereby block the reverse current from reaching the battery.

2. The system of claim 1, wherein the motor drive includes a three-phase electric motor.

3. The system of claim 1, wherein the battery includes a positive terminal and a negative terminal, and the battery is properly connected to the drive circuitry when the positive terminal of the battery is electrically connected to the high side of the drive circuitry.

4. The system of claim 1, wherein the N-channel MOSFET, the FET controller, and at least part of the drive circuitry are physically incorporated into a motor controller which is physically attached to the motor drive and configured to control operation of the motor drive.

5. A system comprising:
   drive circuitry including a high side and a low side;
   a battery connected to the drive circuitry, configured to store electrical energy, and including a positive terminal and a negative terminal;
   a motor drive connected to the drive circuitry and configured to—
      receive the electrical energy from the battery via the drive circuitry and convert the electrical energy into mechanical energy, and
      convert mechanical energy into a reverse current and provide the reverse current via the drive circuitry to the battery;
   a N-channel MOSFET connected to the high side of the drive circuitry; and
   a FET controller connected to the high side of the drive circuitry, and including a charge pump connected to a gate terminal of the N-channel MOSFET, and configured to control operation of the N-channel MOSFET by—
      when the positive terminal of the battery is connected to the high side of the drive circuitry, holding the charge pump in continuous operation when the reverse current is present on the drive circuitry and thereby provide a boost voltage to the gate terminal and allow the reverse current to flow through the N-channel MOSFET to the battery, and
      when the positive terminal of the battery is not connected to the high side of the drive circuitry, switching off the charge pump and thereby remove the boost voltage from the gate terminal and cause the N-channel MOSFET to remain open and non-conducting and thereby block the reverse current from reaching the battery.

6. The system of claim 5, wherein the motor drive includes a three-phase electric motor.

7. The system of claim 5, wherein the N-channel MOSFET, the FET controller, and at least part of the drive circuitry are physically incorporated into a motor controller which is physically attached to the motor drive and configured to control operation of the motor drive.

8. A method for facilitating regenerative charging of a battery by a motor drive when the battery is properly connected to drive circuitry, and for blocking regenerative charging of the battery by the motor drive when the battery is improperly connected to the drive circuitry, wherein an N-channel MOSFET and a FET controller are connected to a high side of the drive circuitry, and the FET controller includes a charge pump connected to a gate terminal of the N-channel MOSFET, the method comprising:

when the battery is properly connected to the drive circuitry, holding the charge pump in continuous operation when a reverse current is driven on the drive circuitry to provide a boost voltage to the gate terminal and allow the reverse current to flow through the N-channel MOSFET to the battery, and when the battery is improperly connected to the drive circuitry, deactivating the charge pump to not provide the boost voltage to the gate terminal and cause the N-channel MOSFET to remain open and non-conducting and block the reverse current from reaching the battery.

\* \* \* \* \*